United States Patent
Bantz et al.

(10) Patent No.: US 9,928,349 B2
(45) Date of Patent: Mar. 27, 2018

(54) SYSTEM AND METHOD FOR CONTROLLING THE DISPOSITION OF COMPUTER-BASED OBJECTS

(75) Inventors: David F. Bantz, Portland, ME (US); Ramon Caceres, New York, NY (US); Thomas E. Chefalas, Somers, NY (US); Srikant Jalan, Cortlandt Manor, NY (US); Steven J. Mastrianni, Unionville, CT (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 2438 days.

(21) Appl. No.: 12/031,136

(22) Filed: Feb. 14, 2008

(65) Prior Publication Data
US 2009/0210885 A1 Aug. 20, 2009

(51) Int. Cl.
*G06F 17/30* (2006.01)
*G06F 21/10* (2013.01)
*G06Q 40/00* (2012.01)

(52) U.S. Cl.
CPC ............. *G06F 21/10* (2013.01); *G06Q 40/00* (2013.01); *G06F 17/3061* (2013.01); *G06F 17/30067* (2013.01); *G06F 17/30575* (2013.01); *G06F 17/30607* (2013.01)

(58) Field of Classification Search
CPC ........... G06F 17/30067; G06F 17/3061; G06F 17/30607; G06F 17/30575
USPC ................ 707/634, 636, 638, 687, 694, 736
See application file for complete search history.

(56) References Cited

U.S. PATENT DOCUMENTS

| | | | | |
|---|---|---|---|---|
| 5,438,508 A | * | 8/1995 | Wyman ................. | G06F 21/105 705/1.1 |
| 5,526,415 A | * | 6/1996 | Wakamoto ........... | H04Q 3/0029 379/202.01 |
| 5,892,900 A | * | 4/1999 | Ginter .................... | G06F 21/10 726/26 |
| 5,896,506 A | * | 4/1999 | Ali .................... | G06F 17/30067 707/E17.01 |
| 5,933,498 A | * | 8/1999 | Schneck ................. | G06F 21/10 705/54 |
| 5,933,647 A | * | 8/1999 | Aronberg ................. | G06F 8/61 717/178 |
| 6,154,766 A | * | 11/2000 | Yost ........................ | H04L 29/06 707/999.1 |
| 6,163,544 A | * | 12/2000 | Andersson .......... | H04L 41/0233 370/422 |
| 6,182,151 B1 | * | 1/2001 | Cheng ..................... | H04L 29/06 718/101 |
| 6,289,455 B1 | * | 9/2001 | Kocher ................ | G06Q 20/367 380/228 |
| 6,314,409 B2 | * | 11/2001 | Schneck ....................... | 380/259 |

(Continued)

FOREIGN PATENT DOCUMENTS

EP 1550930 A1 * 7/2005

*Primary Examiner* — Frantz Coby
(74) *Attorney, Agent, or Firm* — Ryan, Mason & Lewis, LLP

(57) ABSTRACT

A secure object manager obtains, from an authorized person, a specification for disposition of at least one object, and creates first instructions, pertaining to the disposition, for a remote secure-object agent on a remote system. A copy of the object and the first instructions are sent to a remote secure-object agent on a remote system, which controls the copy based on the first instructions.

25 Claims, 5 Drawing Sheets

(56) References Cited

U.S. PATENT DOCUMENTS

| | | | | |
|---|---|---|---|---|
| 6,564,253 | B1* | 5/2003 | Stebbings | G06Q 20/40 380/201 |
| 6,760,733 | B1* | 7/2004 | Komine | H04L 41/0233 |
| 6,772,137 | B1* | 8/2004 | Hurwood | G06F 17/3061 |
| 6,845,394 | B2* | 1/2005 | Ritche | G06F 8/60 709/221 |
| 6,941,309 | B2* | 9/2005 | Mitomi | G06F 17/30607 |
| 6,961,858 | B2* | 11/2005 | Fransdonk | G06F 21/10 380/281 |
| 6,972,663 | B1* | 12/2005 | Messlem | G06K 7/0008 340/10.2 |
| 7,113,948 | B2 | 9/2006 | Jhingan et al. | |
| 7,167,899 | B2 | 1/2007 | Lee et al. | |
| 7,249,107 | B2* | 7/2007 | Yaacovi | G06F 21/10 705/51 |
| 7,275,039 | B2* | 9/2007 | Setteducati | G06Q 10/06314 705/7.24 |
| 7,281,274 | B2* | 10/2007 | Manning | G06F 21/10 709/219 |
| 7,590,863 | B2* | 9/2009 | Lambert | 713/189 |
| 7,734,551 | B1* | 6/2010 | Lindeman | G06F 21/10 705/59 |
| 7,827,147 | B1* | 11/2010 | D'Hoye et al. | 707/652 |
| 7,917,965 | B2* | 3/2011 | Manning | G06F 21/10 726/27 |
| 8,225,310 | B1* | 7/2012 | Robertson | G06F 8/65 717/168 |
| 8,332,328 | B2* | 12/2012 | Schull | G03B 13/02 705/50 |
| 8,520,850 | B2* | 8/2013 | Helms | H04L 63/0428 380/201 |
| 8,549,172 | B2* | 10/2013 | Kessler | H04L 67/34 709/219 |
| 8,713,110 | B2* | 4/2014 | Oliver | G06F 21/6227 709/206 |
| 8,788,423 | B2* | 7/2014 | Dowdy | G06F 21/10 705/26.1 |
| 8,973,160 | B2* | 3/2015 | Manning | G06F 21/10 726/1 |
| 2002/0091776 | A1 | 7/2002 | Nolan et al. | |
| 2002/0133568 | A1 | 9/2002 | Smith et al. | |
| 2003/0041050 | A1 | 2/2003 | Smith et al. | |
| 2003/0105718 | A1* | 6/2003 | Hurtado | G06F 21/10 705/51 |
| 2003/0144961 | A1 | 7/2003 | Tharaken et al. | |
| 2003/0145061 | A1* | 7/2003 | Kochiya | H04L 41/0853 709/208 |
| 2004/0034894 | P1* | 2/2004 | Love | Plt./263 |
| 2004/0143632 | A1 | 7/2004 | McCarthy | |
| 2004/0148523 | A1* | 7/2004 | Lambert | 713/201 |
| 2004/0158527 | A1* | 8/2004 | Lambert | 705/51 |
| 2005/0049973 | A1* | 3/2005 | Read | G06Q 10/06 705/59 |
| 2005/0076082 | A1* | 4/2005 | Le Pennec et al. | 709/206 |
| 2005/0102297 | A1* | 5/2005 | Lloyd | G06F 17/30067 |
| 2005/0192902 | A1* | 9/2005 | Williams | G06F 21/10 705/51 |
| 2006/0031320 | A1* | 2/2006 | Holloway et al. | 709/206 |
| 2006/0041596 | A1* | 2/2006 | Stirbu | G06F 17/30017 |
| 2006/0140585 | A1* | 6/2006 | Strasser | 386/94 |
| 2007/0073816 | A1 | 3/2007 | Kumar et al. | |
| 2007/0074198 | A1* | 3/2007 | Gassoway | H04L 67/06 717/168 |
| 2007/0198434 | A1* | 8/2007 | Jang | G06F 21/10 705/67 |
| 2008/0027867 | A1* | 1/2008 | Forbes | G06F 21/10 705/51 |
| 2008/0033801 | A1* | 2/2008 | McKenna | G06Q 30/02 705/14.4 |
| 2008/0147861 | A1* | 6/2008 | Oishi | G06F 21/64 709/225 |
| 2008/0208756 | A1* | 8/2008 | Kim | G06F 21/575 705/59 |
| 2008/0307265 | A1* | 12/2008 | Vertes | G06F 11/1438 714/38.13 |
| 2009/0183195 | A1* | 7/2009 | Alve | H04N 5/913 725/25 |
| 2010/0174652 | A1* | 7/2010 | Shear | H04L 12/40117 705/53 |
| 2010/0299364 | A1* | 11/2010 | Baldwin | G06F 17/279 707/797 |
| 2011/0047078 | A1* | 2/2011 | Ginter | G06F 21/00 705/53 |
| 2014/0059234 | A1* | 2/2014 | Matthews | H04L 41/0806 709/226 |
| 2014/0123218 | A1* | 5/2014 | Schneck | G06F 21/10 726/1 |
| 2016/0301677 | A1* | 10/2016 | Helms | H04L 63/08 |

* cited by examiner

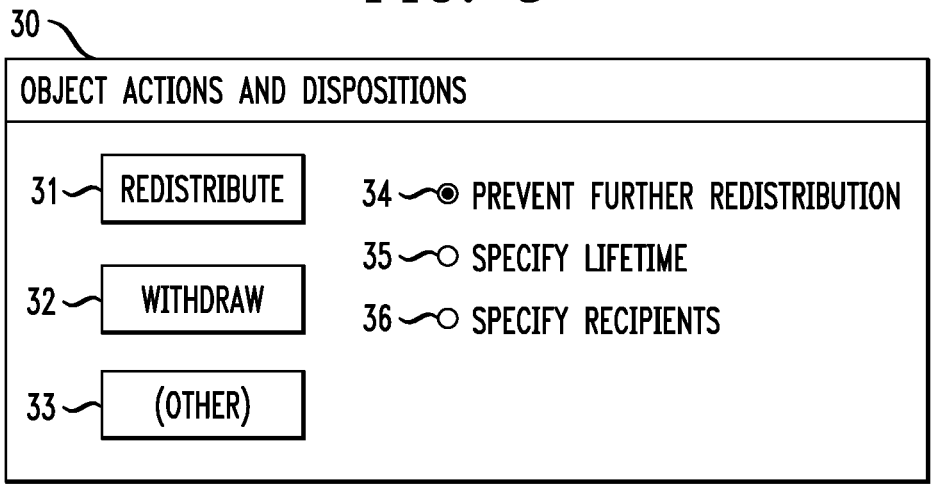

SYSTEM AND METHOD FOR CONTROLLING THE DISPOSITION OF COMPUTER-BASED OBJECTS

FIELD OF THE INVENTION

The present invention relates to the electrical and electronic arts, and, more particularly, to computer software and the like.

BACKGROUND OF THE INVENTION

In modern computer systems, software resources such as data, files, handles, processes and other abstractions are often referred to as "objects." The purpose of the computer operating system and its application programs is the creation and manipulation of objects. It is often desirable to copy an object and send it to a remote location for use by others. For example, a company may originate design documents describing the work product for a given contract and send a computer-based representation of these design documents to a client for review. In some cases, this information represents significant work, and hence value, and the originating company may experience a significant loss of tangible or intangible assets if the information is redistributed to other than its clients.

SUMMARY OF THE INVENTION

Principles of the present invention provide techniques for controlling the disposition of computer-based objects. In one aspect, an exemplary method (which can be computer implemented) for controlling disposition of at least one computer-based object, includes the steps of obtaining, by a secure object manager, from a person authorized to specify the disposition of the at least one object, a specification of such disposition; and creating, with the secure object manager, first instructions for a remote secure-object agent on a remote system. The first instructions pertain to the disposition. The method further includes facilitating sending a copy of the object and first instructions to the remote secure-object agent on the remote system.

In another aspect, an exemplary method (which can be computer implemented) for controlling disposition of at least one copy of a computer-based object, includes the step of obtaining, by a secure object agent from a remote secure object manager, a copy of the object together with first instructions. The first instructions specify allowable disposition of the copy. Additional steps include obtaining, by the secure object agent, from a recipient of the copy, a specification of putative further disposition of the copy; and comparing, by the secure object agent, the specification of the putative further disposition, to the first instructions. Responsive to the comparing indicating that the putative further disposition of the copy is not permitted by the first instructions, an alternative specification from the recipient is awaited.

In still another aspect, an exemplary method (which can be computer implemented) of providing a service for controlling disposition of at least one computer-based object, includes the steps of obtaining, by a service provider, from a person authorized to specify the disposition of the at least one object, a specification of such disposition and a copy of the object; facilitating, by the service provider, receipt of requests for access to the copy; and performing, by the service provider, at least one of granting and denying the requests for access to the copy, in accordance with the specification of the disposition. The copy may reside on a server. A fee may be charged for the service.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of a system (or apparatus) including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may offer one or more of the following technical benefits: privacy, security, non-repudiation, quality of service control, audit-ability and enhanced ease-of-use.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIG. 3 illustrates an exemplary user interface to the object owner, according to another aspect of the invention;

FIG. 4 illustrates an exemplary representation for disposition instructions, according to yet another aspect of the invention;

DETAILED DESCRIPTION OF PREFERRED EMBODIMENTS

One or more embodiments of the invention provide a system and method for controlling computer-based objects (data, program text, processes, and the like); specifically, for allowing a sender or originator of such objects control over their eventual disposition. One or more embodiments provide for the transmission of computer-readable data, used for subsequent control, when a computer-based object is transmitted or instantiated remotely. Subsequent attempts to re-transmit, copy or otherwise redistribute the object will cause a software agent to reference this data, which may prevent or otherwise constrain the redistribution.

Thus, one or more embodiments of the invention provide control over the disposition of a computer-based object to its remote originator. This is accomplished by an interaction between a secure origination agent and a secure destination agent. Such interaction contains computer-readable data or executable computer code. This data or code has the effect of conveying the wishes of the originator concerning subsequent actions on the computer-based object to the secure destination agent. These actions may concern redistribution of the object, the lifetime of the object, who may (or may not) access the object, as well as other actions. For example, it may be a permitted use of the object to redistribute it, but all such attempts at redistribution may result in a notification to the originator. One or more embodiments of the invention are particularly useful in establishing a permanent record of who used the object and in what way.

Figure 1:
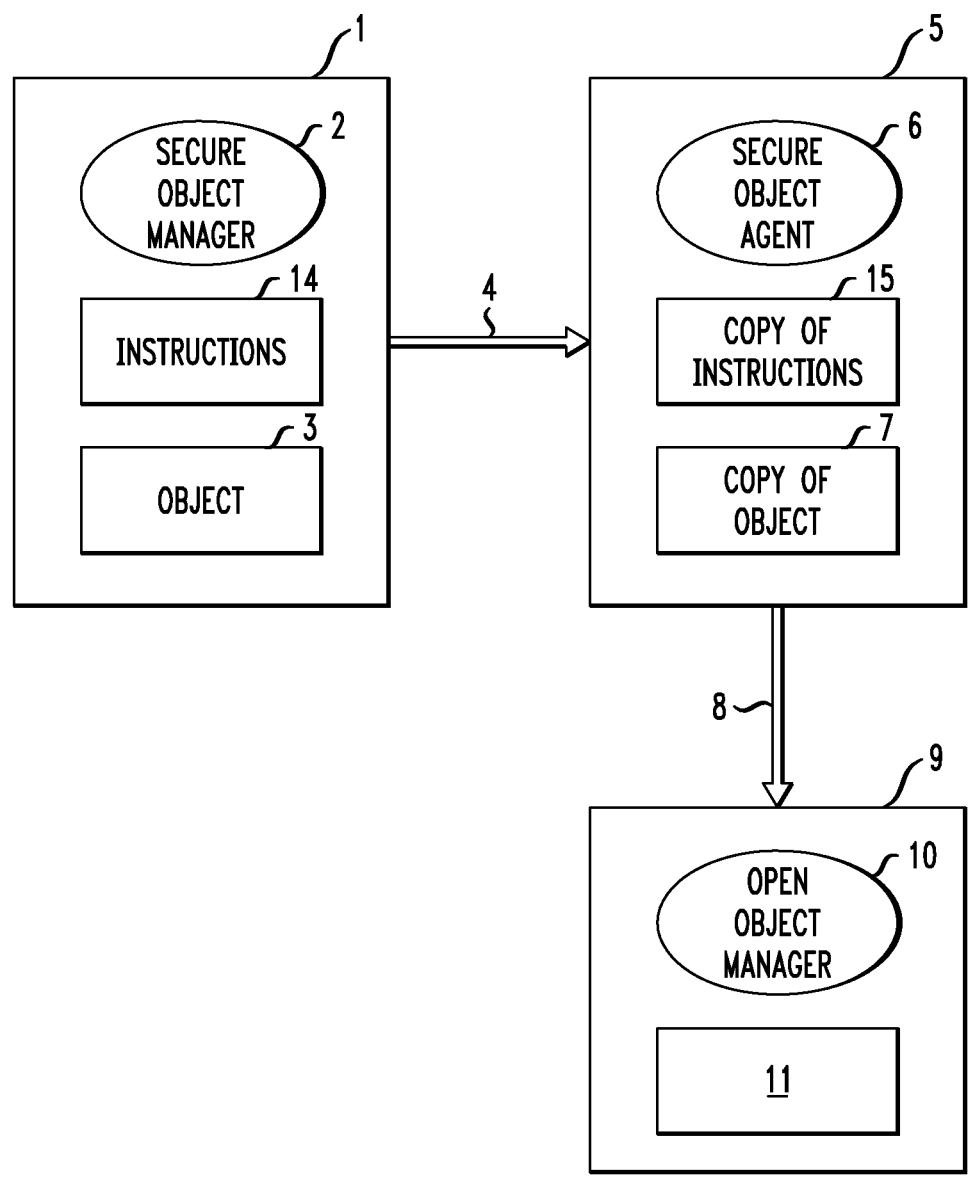
FIG. 1 illustrates the general disposition of system elements, in an exemplary embodiment.

FIG. 1 shows the overall configuration of one exemplary embodiment of the invention. In the figure, the system 1 of the originator of the object 3 contains secure object manager 2, whose function is to manage the existing object 3. Also shown in the figure are instructions 14 which control the disposition of distributed object copies. The secure object manager 2 may be a part of the software that previously created the object, or may be a separate software entity. A copy of object 3 may be transferred from originator system 1 to recipient system 5, via communication link 4. The copy 7 of object 3 is shown residing in recipient system 5. Also shown residing in recipient system 5 is secure object agent 6, together with a copy 15 of the instructions 14. When secure object manager 2 transmits the copy of object 3 to recipient system 5, object copy 7 is thereby created, and is accompanied by just-mentioned copy 15 of the instructions 14. Link 4 may be any link capable of data communication, by way of example and not limitation, modem-based communication over telephone lines, wireless wide area networks (WAN) and local area networks (LAN), and computer networks such as the Internet.

Also shown in FIG. 1 is redistribution target system 9 containing open object manager 10. Open object manager 10 is not secure, nor is it capable of following any distributed instructions. In the illustrated embodiment, the originator cannot control redistribution by open object manager 10. Element 8 represents a potential communication link between recipient system 5 and redistribution target system 9. A potential location for yet another copy of object 3 is shown in redistribution target system 9 as location 11.

If secure object agent 6 were to be instructed to make a copy of object copy 7 and transmit it to redistribution target system 9, secure object agent 6 would, by design and construction, consult copy 15 of instructions 14. If copy 15 of instructions 14 permitted this copy and transmission, then secure object agent 6 would perform the requested operation; however, but if copy 15 of instructions 14 did not permit the requested copy and transmission, then secure object agent 6 would reject the requested operation.

Secure object manager 2, secure object agent 6, and copy 15 of instructions 14 will be described hereinafter.

In the exemplary embodiment of FIG. 1, secure object manager 2 is realized as utility software running on an operating system which, in turn, runs on computer hardware. Significant properties of the secure object manager software, in the exemplary embodiment, are as follows:
1. This software is responsive to directions received from the originator of the managed object, and to no other entity.
2. No other software has access to the managed object, and thus no other software can perform the functions of the secure object manager.
3. It must be possible for this software to transmit copies of managed objects without modification and without making a copy not subject to access controls, and it must be possible for this software to transmit instructions without modification.

These properties of the secure object manager software, in turn, require certain properties of the operating system in the exemplary embodiment:

1. The operating system must limit access to the managed object to only the secure object manager. As storage and transmission of objects requires one or more functions of the operating system, the operating system must guarantee access rights.
2. Optionally but preferably, the operating system authenticates a given user of the secure object manager and verifies that this user is the originator of the managed object. The operating system should guarantee that the only input that is received by the secure object manager is that from the authenticated originator.

Advantageously, in the exemplary embodiment, it is not required that the operating system be capable of secure, private transmission of data from system to system.

Given the teachings herein, the skilled artisan will be able to implement an operating system meeting the above requirements. International standard ISO/IEC 15408 concerns evaluation criteria for information technology (IT) security. The book "Security in Computing, third edition" by Charles P. Pfleeger and Shari Lawrence Pfleeger, Prentice Hall PTR, publisher (2002) covers properties of secure operating systems and the techniques needed to achieve them. The aforementioned standard and book are typical of the concepts of operating systems which the skilled artisan will have familiarity with.

Secure object agent 6 in the embodiment of FIG. 1, is utility software running on an operating system which, in turn, runs on computer hardware. Significant properties of the secure object agent software, in the exemplary embodiment, are as follows:
1. This software is responsive to directions received from its user, and to no other entity.
2. No other software has access to the managed object copy 7, and thus no other software can perform the functions of the secure object agent.
3. It must be possible for this software to transmit copies of managed objects without modification and without making a copy not subject to access controls, and it must be possible for this software to re-transmit instructions without modification.

These properties are similarly reliant on the above-mentioned properties of the operating system that hosts the secure object agent software.

Figure 2:
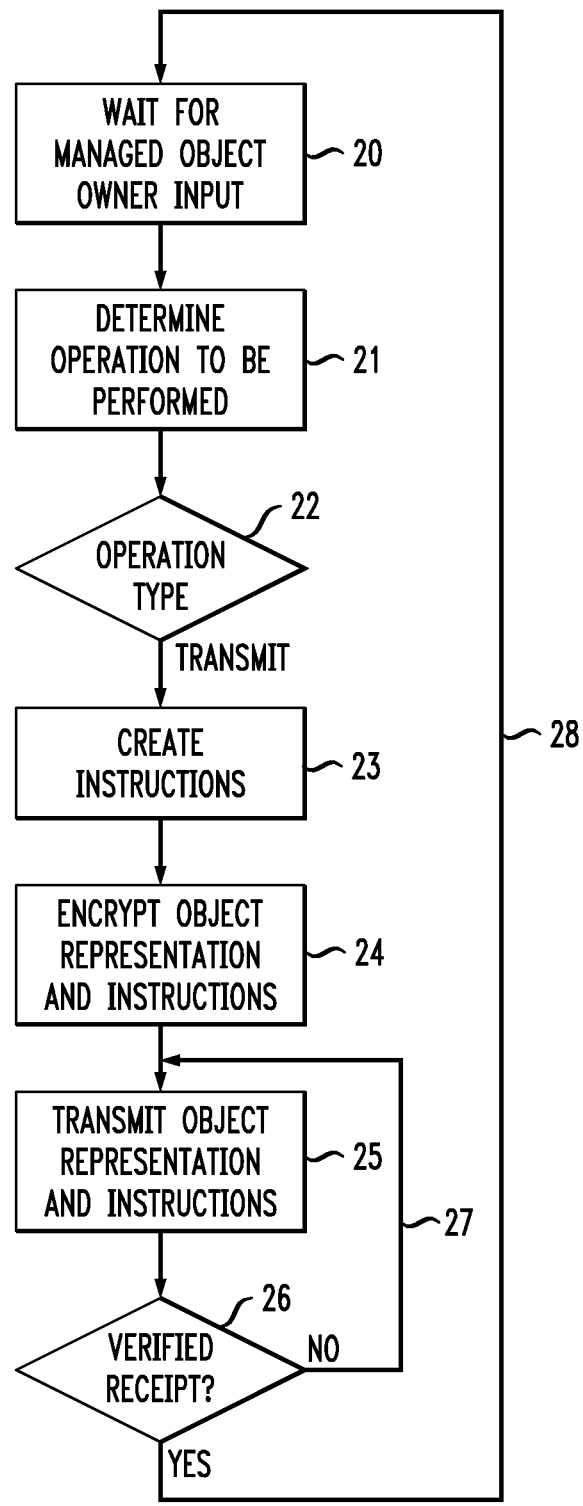
FIG. 2 illustrates exemplary flow of processing in a secure object manager, according to an aspect of the invention.

The function of the secure object manager 2 of FIG. 1 will now be described with reference to FIG. 2. FIG. 2 is a flowchart of the sequence of actions performed by the secure object manager 2 of FIG. 1. The flow begins with block 20, which includes waiting for the next input from the owner of the managed object. The input should identify both the owner and the managed object, and access to the managed object must be guaranteed by the computer's operating system. Processing continues with block 21 the operation to be performed and the distribution instructions are solicited from the object owner. FIG. 3, to be discussed further below, shows an exemplary user interface from which this information may be obtained. Once the input of operation type and distribution instructions has been obtained from the owner, decision block 22 controls which processing steps are performed subsequently. Only a single branch is shown from decision block 22 in FIG. 2, it being understood that there are many possible branches that may be taken. Stated in another way, no alternatives to the TRANSMIT operation are shown in FIG. 2, although there are many possible operations. The processing shown in FIG. 2 is typical.

Once the operation type has been determined, for the TRANSMIT operation, processing continues in block 23 where instructions to be followed by the secure object agent 6 of FIG. 1 are generated. Central to the security and privacy of disposition control is the processing in block 24, which prevents inspection of the copied object representation and instructions, and accompanies the transmission of the copied object representation and instructions with a cryptographic message digest. Given the teachings herein, such a digest can be computed with one-way hash functions known to those skilled in the art, for example, according to the teachings of the book "Applied Cryptography, second edition" by Bruce Schneier, published by John Wiley and Sons (1966), which is exemplary of cryptographic techniques known to those skilled in the art. A message digest allows the recipient to reliably detect any alteration in a transmitted message.

In block 25, the copied object representation, the instructions, and any additional data (for example, message digests) are sent to the recipient. Decision block 26 then verifies receipt and if the verification is positive, branch 28 is taken to await the next owner input. If the verification is not positive, branch 27 is taken to retry the transmission. If the transmission fails after a predetermined number of retries, an error condition is recognized and secure object manager function ceases.

As mentioned previously, FIG. 3 illustrates an exemplary user interface for the owner to input (i) what operations are to be performed and (ii) with what instructions. FIG. 3 illustrates a user interface frame 30 containing three action buttons 31, 32 and 33. Action button 31 selects the redistribution function of the secure object manager. This is the function whose flow is illustrated in FIG. 2. Action button 32 selects the withdrawal function of the secure object manager, in which all transmitted copies of the managed object are immediately destroyed. By way of clarification, when copies are withdrawn, all copies (in recipient system 5 and in all other redistribution sites) are destroyed. Action button 33, labeled "(other)," indicates that other actions may be defined for this user interface. Frame 30 also contains three selector buttons 34, 35 and 36. Button 34 is shown selected, to supply instructions to secure object agents not to redistribute copies of the managed object. Button 35 is shown not selected. If selected, a subsequent dialog would appear allowing the selection of a lifetime for the copies of the managed object. If button 36 were selected, a subsequent dialog would appear allowing the selection of a set of possible re-redistribution recipients (or alternatively, a selection of people who should not be allowed to be recipients of redistributed copies). Button 36 is shown "grayed out" to indicate that if there is to be no further redistribution, as specified by button 34, then it is not possible to select specific redistribution recipients.

FIG. 4 depicts a non-limiting exemplary representation of disposition instructions, as a snippet from an extensible mark-up language (XML) document. Although there are many such possible representations, XML is a preferred form because such documents can be described in machine-readable form with an XML schema. In the figure, line 40 begins a block of disposition instructions which ends with line 45. Line 41 begins a block controlling redistribution. Line 42 specifies that redistribution is not allowed, and line 43 ends the block controlling redistribution. Two other blocks are shown, controlling the lifetime of the redistributed copy (in this example, unlimited) and a block beginning with line 44 that can be used for special processing instructions (none present in this case). Note that the XML snippet of FIG. 4 is exemplary of the output of block 23 of FIG. 2.

In response to the transmission of the object representation, instructions, and ancillary data, which were originated by the secure object manager 2 of FIG. 1 in block 25 of FIG. 2, the secure object agent 6 of FIG. 1 stores the object representation and instructions in persistent storage and acknowledges proper receipt of this data to the secure object manager 2.

Figure 5:
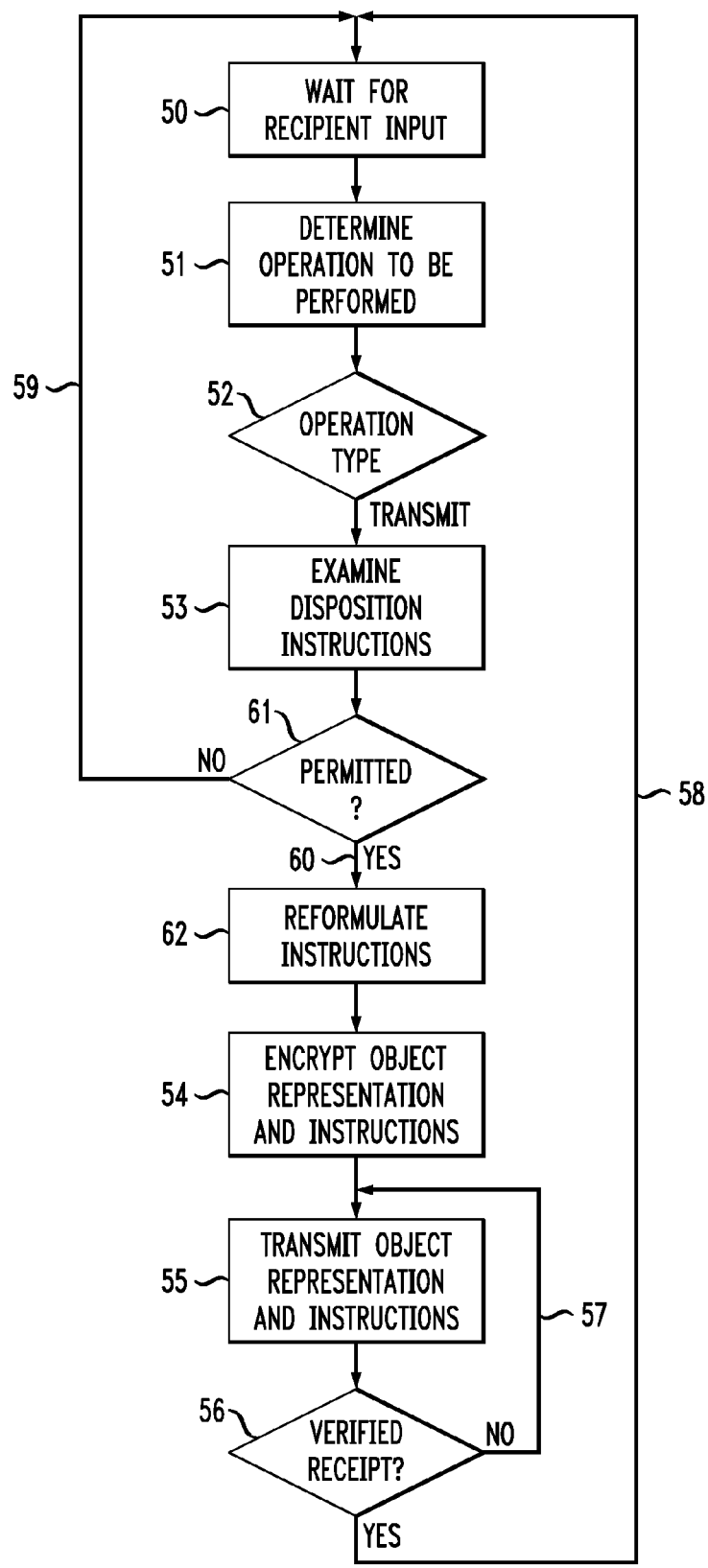
FIG. 5 illustrates exemplary flow of processing in a secure object agent, according to still another aspect of the invention.

FIG. 5 illustrates exemplary processing flow of the secure object agent 6 of FIG. 1, when a user of agent 6 wishes to perform an action on the copy 7 of the managed object that it controls. FIG. 5 is a flowchart of the sequence of actions performed by the secure object agent 6 of FIG. 1. The flow begins with block 50, which includes waiting for the next input from the recipient of the managed object. In the illustrative embodiment, the input should identify both the recipient and the managed object, and access to the managed object must be guaranteed by the computer's operating system. Processing continues with block 51, where the operation to be performed and the distribution instructions are solicited from the object recipient. If the operation is redistribution of the object to an open object manager, shown as 10 in FIG. 1, no distribution instructions need be solicited, because the destination object manager is incapable of following them. If, on the other hand, the operation is redistribution of the object to another secure object agent, then new distribution instructions may be appropriate. The user interface for this solicitation can be similar to that of FIG. 3. Once the input of: (i) operation type and (ii) distribution instructions has been obtained from the recipient, decision block 52 controls which processing steps are performed subsequently. As with block 22 of FIG. 2, no alternatives to the TRANSMIT operation are shown in FIG. 5, but it will be understood that there are many possible operations. The processing shown in FIG. 5 is typical.

Once the operation type has been determined, processing continues in block 53, where the instructions 15 received from the original owner are examined. Examination can, for example, take the form of XML parsing, as the instructions are preferably represented as an XML document. Decision block 61 determines if the operation that the recipient has requested is permitted according to the disposition instructions 15. If not, branch 59 is taken, to wait for further recipient input. If permitted, branch 60 is taken to block 62, in which new instructions are formulated.

Block 62 deletes all instructions in the case where the new recipient is an open object manager. If the new recipient is a secure object agent, however, that agent should receive instructions that combine the instructions from the object's owner and the new instructions from the object's recipient. This combination creates reformulated instructions. In one or more embodiments, the rule that is followed is that a given instruction (say, whether redistribution is allowed) differs between the owner's instruction and the recipient's instruction, the resultant instruction is the stricter of the two, or the intersection of the two sets. For example, if the owner allows redistribution and the recipient does not, the instruction formulated in block 62 will not allow redistribution. Similarly, if the owner allows redistribution to A, B and C and the recipient allows redistribution to C, D, E and F, the reformulated instruction will allow redistribution only to C.

Secure agent processing proceeds in a manner identical to that of secure object manager processing, with blocks 54, 55 and 56 being analogous to blocks 24, 25, and 26, and with branches 57 and 58 being analogous to branches 27 and 28 in FIG. 2. Refer to the above description of the secure object manager processing for details.

In addition to receiving object copies and interacting with its user, the secure object agent 6 will detect certain incoming instructions and perform actions later based upon them.

An example is the "lifetime" instruction, which specifies that an object copy has a limited lifetime. When the secure object agent receives an object copy with lifetime instructions, it should set a reminder (for example, a timer-based interrupt) that will erase the object copy when its lifetime expires.

It should be understood that in the previous discussion, control over the actions to be taken on a managed object and the disposition instructions was exercised by the object owner. In fact, any person so authorized may initiate actions and select disposition instructions (actions by an authorized person should also be understood to include actions by a computer process delegated to by such person, which process could initiate actions and select disposition instructions). Given the teachings herein, the skilled artisan will be able to develop one or more techniques regarding how a given person can be so authorized.

Many forms and applications of this invention are possible. One or more embodiments are particularly valuable in the case where auditable histories of objects must be maintained in accordance with government or industry regulations. In this case, the distribution instructions include an instruction that requires logging of any actions that are performed on the object copy. Another type of instruction changes access modes to the object based on time. An example of this would be where a document is initially distributed with writable access to allow revision, but reverts to read-only access after the revision period has expired. Other forms of instructions can limit whether the object can be printed, saved to an archival medium (for example, compact disk read-only memory (CD-ROM)), or indexed. The distribution instructions may specify a lifetime, but may permit re-authorization by the object owner to begin another lifetime.

The types of objects to which one or more embodiments of the invention can be applied include, but are not limited to, instant messages, e-mails, music files, video files, software, running processes, e-books, Web pages, and the like.

In another aspect, one or more instances of the invention may be practiced as a service. In this case, an object owner sends a copy of the object, together with distribution instructions, to a third-party server maintained by a service provider. Clients wishing to access the object copy connect to the server. The server enforces the distribution instructions, including lifetime and access controls. Charging for the service can be done on a flat-fee basis, or can be based on actual usage of the server. Thus, an exemplary method of providing a service for controlling disposition of at least one computer-based object, includes the steps of obtaining, by a service provider, from a person authorized to specify the disposition of the at least one object, a specification of such disposition and a copy of the object; facilitating, by the service provider, receipt of requests for access to the copy (the copy residing on a server); performing, by the service provider, at least one of granting and denying the requests for access to the copy, in accordance with the specification of the disposition; and charging a fee for the service.

One or more embodiments of the invention thus provide a secure object manager, which stores objects to be distributed; a set of distribution instructions, which control subsequent distribution of the stored object; a transmission system that transmits a copy of the stored object; and a secure object agent, which stores object copies and enforces the distribution instructions.

While exemplary embodiments employing encryption and decryption have been set forth, it should be noted that if the distribution were over a secure link, then the object would not have to be encrypted. Thus, encryption is not essential, providing that the privacy of the object can be assured in some other way.

In addition to the exemplary types of objects already discussed, in some instances, computer-based objects whose disposition is to be controlled may be inventory items of VU (virtual universe) users. Such users typically have an inventory of items that they own, and these inventory items may be bought, sold, traded, etc. during operation of the VU. Items in a typical inventory may include clothing, virtual pets, vehicles, electronic media (e.g., music files), or other possessions. Each inventory item may represent a piece of code or other data which may be rendered in some fashion to the user during a session in the VU. Clothing inventory, for example, may be rendered as clothing for the user's avatar while a virtual dog, in another example, may render as an automated avatar that follows the user's avatar within the VU. The contents of a user's inventory are typically displayed in a hierarchical manner similar to an operating system's display of folders, subfolders, and files within a file system.

Inventory items may be any item that may be associated with a user in a virtual universe. Inventory items may each be composed of one or more files, be part of a larger database, or be stored in any other fashion. In some embodiments, an inventory item may be a piece of software code that is renderable in a virtual universe. In other embodiments, inventory items may be represented as non-executable data that may be used by the VU to render the inventory item for the user when needed. Non-limiting examples of inventory items include graphics files, sound files, animations, electronic documents, video files, avatar clothing or accessories, avatar body parts, avatar tools or vehicles or other objects, avatar gestures, automated avatars, calling cards, landmarks (such as bookmarked locations) or other geographical information, items in a lost and found folder, note cards, photos and photo albums, scripts (e.g., macros to perform actions), textures, deleted items, or any other type of item. One of ordinary skill in the art will recognize that inventory items may include executable code, non-executable data, or any other type of information, and may also represent any type of item within a VU.

By way of summary and provision of further detail, various types of controls on object disposition may include, for example, one or more of permission to save to disk, permission to print, permission to forward (send to another party), permission to extend or defeat expiration time-out, permission to edit, permission to index, permission to read, permission to delete (deletion to be broadly understood to also encompass un-installing a program).

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented in the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 6:
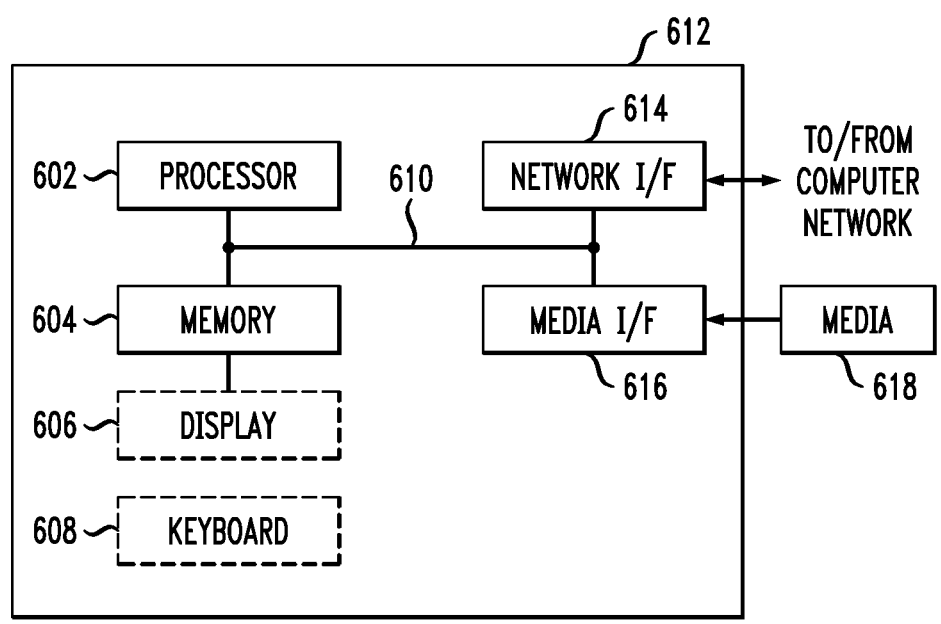
FIG. 6 depicts a computer system that may be useful in implementing one or more aspects and/or elements of the invention.

One or more embodiments can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 618) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 604), magnetic tape, a removable computer diskette (for example media 618), a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 602 coupled directly or indirectly to memory elements 604 through a system bus 610. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for controlling disposition of at least one computer-based object, said method comprising the steps of:
    obtaining, by at least one processing device of a secure centralized object manager server, from a person authorized to specify said disposition of said at least one computer-based object, a specification of such disposition;
    creating, with at least one processing device of said secure centralized object manager server, first instructions to be evaluated by a remote secure-object agent on a remote system, wherein said first instructions (i) pertain to said disposition of said at least one computer-based object, and (ii) specify whether redistribution of said at least one computer-based object by said remote secure-object agent is allowed; and
    facilitating sending a copy of said computer-based object and said first instructions to said remote secure-object agent on said remote system, wherein said remote secure-object agent evaluates a request to redistribute said at least one computer-based object to one or more of an insecure open object manager that is distinct from said remote secure-object agent and an additional remote secure-object agent on a second remote system by comparing said request to redistribute to said first instructions specifying whether said redistribution of said at least one computer-based object by said remote secure-object agent is allowed.

2. The method of claim 1, wherein said obtaining step comprises obtaining a selection of an action to be performed on said at least one computer-based object, said specification of said disposition being obtained in association with said action.

3. The method of claim 2, wherein said obtaining said selection of said action comprises presenting, to said person, at least choices for redistributing and withdrawing said computer-based object.

4. The method of claim 3, wherein said redistributing comprises at least one of unlimited redistributing, redistributing subject to originator notification, redistributing subject to a limited lifetime, redistributing subject to logging of actions performed on said copy of said computer-based object, and redistributing subject to time-changing access rules.

5. The method of claim 3, further comprising the additional steps of:
obtaining, from said person, selection of said redistributing choice; and
responsive to said selection of said redistributing choice, offering said person choices for said specification of said disposition, said choices comprising at least preventing further distribution, specifying a lifetime for said copy, and specifying recipients for said copy.

6. The method of claim 5, wherein said choices further comprise permission to save to disk, permission to print, permission to perform at least one of extending and defeating expiration time-out, permission to edit, permission to index, permission to read, and permission to delete.

7. The method of claim 3, further comprising the additional steps of:
obtaining, from said person, selection of said withdrawing choice; and
responsive to said selection of said withdrawing choice, facilitating destruction of all transmitted copies of said computer-based object.

8. The method of claim 1, further comprising the additional step of verifying receipt of said copy of said computer-based object and said first instructions by said remote secure-object agent on said remote system.

9. The method of claim 1, further comprising the additional step of controlling said copy of said remote system, based on said first instructions.

10. The method of claim 9, wherein said controlling comprises:
obtaining, by said secure object agent, from a recipient of said copy, a specification of putative further disposition of said copy;
comparing, by said secure object agent, said specification of said putative further disposition, to said first instructions; and
responsive to said comparing indicating that said putative further disposition of said copy is not permitted by said first instructions, awaiting alternative specification from said recipient.

11. The method of claim 10, further comprising the additional steps of:
obtaining, by said secure object agent, from said recipient of said copy, said alternative specification;
comparing, by said secure object agent, said alternative specification to said first instructions; and
responsive to said comparing indicating that said alternative specification is permitted by said first instructions, carrying out said alternative specification.

12. The method of claim 10, wherein said specification of putative further disposition comprises putative redistribution of said copy of said computer-based object to an open object manager.

13. The method of claim 10, wherein said specification of putative further disposition comprises putative redistribution of said copy of said computer-based object to a further secure object agent on a further remote system, further comprising the additional step of prompting said recipient whether said first instructions are to be modified for said redistribution to said further secure object agent on said further remote system.

14. The method of claim 9, wherein said obtaining, creating and facilitating occur substantially at an originating system, further comprising the additional steps of:
encrypting said copy of said computer-based object and said first instructions at said originating system; and
decrypting said copy of said computer-based object and said first instructions at said remote system.

15. A method for controlling disposition of at least one copy of a computer-based object, said method comprising the steps of:
obtaining, by at least one processing device of a secure object agent from a remote secure object manager, a copy of said computer-based object together with first instructions, said first instructions specifying allowable disposition of said copy;
obtaining, by at least one processing device of said secure object agent, from a recipient of said copy, a specification of putative further disposition of said copy;
comparing, by at least one processing device of said secure object agent, said specification of said putative further disposition, to said first instructions; and
responsive to said comparing indicating that said putative further disposition of said copy is not permitted by said first instructions, awaiting alternative specification from said recipient.

16. The method of claim 15, further comprising the additional steps of:
obtaining, by said secure object agent, from said recipient of said copy, said alternative specification;
comparing, by said secure object agent, said alternative specification to said first instructions; and
responsive to said comparing indicating that said alternative specification is permitted by said first instructions, carrying out said alternative specification.

17. The method of claim 15, wherein said specification of putative further disposition comprises putative redistribution of said copy of said computer-based object to an open object manager.

18. The method of claim 15, wherein said specification of putative further disposition comprises putative redistribution of said copy of said computer-based object to a further secure object agent on a further remote system, further comprising the additional step of prompting said recipient whether said first instructions are to be modified for said redistribution to said further secure object agent on said further remote system.

19. The method of claim 15, wherein said first instructions further specify at least one action to be taken subsequent to obtaining said instructions, further comprising the additional step of performing said at least one action.

20. The method of claim 19, wherein said at least one action comprises checking a lifetime of said copy of said computer-based object.

21. A method of providing a service for controlling disposition of at least one computer-based object, said method comprising the steps of:
obtaining, by at least one processing device of a service provider, from a person authorized to specify said disposition of said at least one object, a copy of said computer-based object and first instructions pertaining to said disposition, wherein said first instructions specify whether redistribution of said at least one computer-based object by a remote secure-object agent is allowed;

facilitating, by at least one processing device of said service provider, receipt of requests for access to said copy by one or more of an insecure open object manager that is distinct from said service provider and an additional remote secure-object agent on a remote system, said copy residing on a server;

comparing, by at least one processing device of said service provider, said requests for access to said first instructions specifying whether said redistribution of said at least one computer-based object by said remote secure-object agent is allowed;

performing, by said service provider, at least one of granting and denying said requests for access to said copy, in accordance with said comparison of said specification of said disposition to said first instructions; and charging a fee for said service.

22. The method of claim 21, wherein said fee comprises at least one of a flat fee and a fee based on usage of said server.

23. A computer program product comprising a non-transitory computer useable medium including computer usable program code for controlling disposition of at least one computer-based object, said computer program product including:

computer usable program code for obtaining, by at least one processing device of a secure centralized object manager server, from a person authorized to specify said disposition of said at least one computer-based object, a specification of such disposition;

computer usable program code for creating, with at least one processing device of said secure centralized object manager server, first instructions to be evaluated by a remote secure-object agent on a remote system, wherein said first instructions (i) pertain to said disposition of said at least one computer-based object, and (ii) specify whether redistribution of said at least one computer-based object by said remote secure-object agent is allowed; and computer usable program code for facilitating sending a copy of said computer-based object and said first instructions to said remote secure-object agent on said remote system, wherein said remote secure-object agent evaluates a request to redistribute said at least one computer-based object to one or more of an insecure open object manager that is distinct from said remote secure-object agent and an additional remote secure-object agent on a second remote system by comparing said request to redistribute to said first instructions specifying whether said redistribution of said at least one computer-based object by said remote secure-object agent is allowed.

24. The computer program product of claim 23, further comprising computer usable program code for controlling said copy of at said remote system, based on said first instructions.

25. A computer program product comprising a non-transitory computer useable medium including computer usable program code for controlling disposition of at least one copy of a computer-based object, said computer program product including:

computer usable program code for obtaining, by at least one processing device of a secure object agent from a remote secure object manager, a copy of said computer-based object together with first instructions, said first instructions specifying allowable disposition of said copy;

computer usable program code for obtaining, by at least one processing device of said secure object agent, from a recipient of said copy, a specification of putative further disposition of said copy;

computer usable program code for comparing, by at least one processing device of said secure object agent, said specification of said putative further disposition, to said first instructions; and computer usable program code for responsive to said comparing indicating that said putative further disposition of said copy is not permitted by said first instructions, awaiting alternative specification from said recipient.

* * * * *